US012284310B2

(12) United States Patent
Brewer et al.

(10) Patent No.: US 12,284,310 B2
(45) Date of Patent: Apr. 22, 2025

(54) EVENT DRIVEN INTELLIGENT HYPERVISOR ON A SMART DEVICE

(71) Applicant: INTERNATIONAL BUSINESS MACHINES CORPORATION, Armonk, NY (US)

(72) Inventors: Derek Brewer, Bowling Green, OH (US); Robert Wilhelm, Cheyenne, WY (US); Jon D Gullixson, Rochester, MN (US); Paul Llamas Virgen, Guadalajara (MX)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 17/934,319

(22) Filed: Sep. 22, 2022

(65) Prior Publication Data
US 2024/0106929 A1 Mar. 28, 2024

(51) Int. Cl.
*H04M 1/04* (2006.01)
*G06F 9/455* (2018.01)
(Continued)

(52) U.S. Cl.
CPC .... *H04M 1/72484* (2021.01); *G06F 9/45558* (2013.01); *H04M 1/72451* (2021.01);
(Continued)

(58) Field of Classification Search
CPC .......... H04M 1/72484; H04M 1/72451; G06F 9/45558; G06F 2009/4557; G06F 2009/45595
(Continued)

(56) References Cited

U.S. PATENT DOCUMENTS 8,839,138 B1 * 9/2014 Pasqua ............... G06F 9/45558
715/703
9,596,345 B2 3/2017 Yach
(Continued)

FOREIGN PATENT DOCUMENTS

WO 2003075543 A2 9/2003

OTHER PUBLICATIONS

US 10,264,069 B2, 06/2019, Puri (withdrawn)
(Continued)

*Primary Examiner* — Moustapha Diaby
(74) *Attorney, Agent, or Firm* — Jordan T. Schiller

(57) ABSTRACT

The invention discloses a computer-implemented method, computer program product, and computer system, for utilizing a hypervisor installed on a smartphone running separate virtual machines (VMs), one configured for personal use and another for work use, thereby allowing for separate operating environments on one piece of hardware. The method includes receiving one or more notifications, or calls, on the smartphone and determining whether the one or more notifications, or calls, are during work hours. The method selects, automatically, the work VM as default if the one or more notifications, or calls, are during work hours. If the one or more notifications, or calls, are not during work hours, the method automatically selects the personal VM as default. The method further notifies a user to switch VMs if the one or more notifications, or calls, occur during a time that is a non-default VM.

20 Claims, 3 Drawing Sheets

(51) Int. Cl.
*H04M 1/72451* (2021.01)
*H04M 1/72484* (2021.01)

(52) U.S. Cl.
CPC .............. *G06F 2009/4557* (2013.01); *G06F 2009/45595* (2013.01)

(58) Field of Classification Search
USPC ........................................ 455/566
See application file for complete search history.

(56) References Cited

U.S. PATENT DOCUMENTS

| | | | |
|---|---|---|---|
| 10,740,133 B2 | 8/2020 | Singh | |
| 2006/0240877 A1* | 10/2006 | Filiba | H04M 1/72451 455/567 |
| 2010/0146504 A1* | 6/2010 | Tang | G06F 9/45537 718/1 |
| 2012/0252536 A1* | 10/2012 | Noda | H04M 1/724 455/566 |
| 2013/0145278 A1* | 6/2013 | Newell | G06F 3/0484 715/738 |
| 2014/0149521 A1* | 5/2014 | Broz | H04W 4/21 709/206 |
| 2015/0067065 A1* | 3/2015 | Dolph | H04L 51/58 709/206 |
| 2015/0264035 A1* | 9/2015 | Waterhouse | G06F 21/6209 726/4 |
| 2017/0054720 A1* | 2/2017 | Geng | H04L 67/568 |
| 2017/0168862 A1* | 6/2017 | Yocam | G06F 9/45558 |
| 2019/0018699 A1* | 1/2019 | Asaro | G06F 9/485 |
| 2021/0255882 A1 | 8/2021 | Nair | |

OTHER PUBLICATIONS

IP.com search history (Year: 2025).*
ProQuest search history (Year: 2025).*
Android, "Supporting Multiple Users", Android Open Source Project, Jun. 6, 2022, 7 pages, https://source.android.com/devices/tech/admin/multi-user.
Brodkin, "AT&T splits phones into work and personal partitions, on any carrier", arsTechnica, Jun. 15, 2020, 7 pages, https://arstechnica.com/information-technology/2012/06/att-splits-phones-into-work-and-personal-partitions-on-any-carrier/.
Disclosed Anonymously, "Agnostic Edge Ecosystem for Sharing Device Capabilities", An IP.com Prior Art Database Technical Disclosure, IP.com No. IPCOM000265478D, IP.com Electronic Publication Date: Apr. 14, 2021, 7 pages.
Disclosed Anonymously, "Intelligent Context Switching of Environment To Suit User's Intent", An IP.com Prior Art Database Technical Disclosure, IP.com No. IPCOM000266194D, IP.com Electronic Publication Date: Jun. 22, 2021, 4 pages.
Disclosed Anonymously, "Pervasive Biometric Authentication in the Smart Home Based On Integrated Light Fingerprint Pads", An IP.com Prior Art Database Technical Disclosure, IP.com No. IPCOM000255131D, IP.com Electronic Publication Date: Sep. 4, 2018, 23 pages.
Friha et al., "Internet of Things for the Future of Smart Agriculture: A Comprehensive Survey of Emerging Technologies", IEEE/CAA Journal of Automatica Sinica, vol. 8, No. 4, Apr. 2021, pp. 718-752.
IBM, "Mobile App Development Platform", accessed Jul. 13, 2022, 12 pages, https://www.ibm.com/cloud/mobile.
Martins et al., "µRTZVISOR: A Secure and Safe Real-Time Hypervisor", Electronics Article, MDPI, Oct. 30, 2017, 31 pages.
Mearian, "Dual-identity smartphones could bridge BYOD private, corporate divide", Computer World, Nov. 26, 2012, 9 pages, https://www.computerworld.com/article/2493260/dual-identity-smartphones-could-bridge-byod-private--corporate-divide.html.
Pinto et al., "It Reshaping Business" Fujitsu, 2012, 56 pages.
Rayome, "Here's how to stop Android apps from stealing and sharing your phone data", Tech Republic, Jul. 5, 2018, 6 pages, https://www.techrepublic.com/article/heres-how-to-stop-android-apps-from-stealing-and-sharing-your-phone-data/.
Stone, "Using your personal phone for work? Here's how to separate your apps and data", Samsung, Published Oct. 26, 2021, 5 pages, https://insights.samsung.com/2021/10/26/using-your-personal-phone-for-work-heres-how-to-separate-your-apps-and-data-2/.
VMOS, "Virtual Android on Android", Independent System, Unlimited Small RAM, FAQ page, accessed on Jul. 13, 2022, 1 page, https://www.vmos.com/.

* cited by examiner

EVENT DRIVEN INTELLIGENT HYPERVISOR ON A SMART DEVICE

BACKGROUND

The present disclosure relates generally to the field of cognitive computing and more particularly to data processing and virtual machines (VMs).

The separation of work and personal life with respect to digital devices has become more complex now that most people always carry at least one smartphone with them. To keep information secure and separate, many people have resorted to carrying separate smartphones: one for business and one for personal affairs.

However, it is a cumbersome task to carry around multiple smartphones since an individual can only use one device at a time.

BRIEF SUMMARY

Embodiments of the present invention disclose a method, a computer program product, and a system, for utilizing a hypervisor installed on a smartphone running separate VMs, thereby allowing for separate operating environments on one piece of hardware.

According to an embodiment, the method receives one or more notifications, or calls, on the smartphone and determines whether the one or more notifications, or calls, are during work hours and if so, automatically selecting the work VM as default. If the one or more notifications, or calls, are not during work hours, the method automatically selects the personal VM as default. The method further prompts a user to switch VMs if the one or more notifications, or calls, come in during a time that is a non-default VM.

A computer program product, according to an embodiment of the invention, includes a non-transitory tangible storage device having program code embodied therewith. The program code is executable by a processor of a computer to perform a method. The method receives one or more notifications, or calls, on the smartphone and determines whether the one or more notifications, or calls, are during work hours and if so, automatically selecting the work VM as default. If the one or more notifications, or calls, are not during work hours, the method automatically selects the personal VM as default. The method further prompts a user to switch VMs if the one or more notifications, or calls, come in during a time that is a non-default VM.

A computer system, according to an embodiment of the invention, includes one or more computer devices each having one or more processors and one or more tangible storage devices; and a program embodied on at least one of the one or more storage devices, the program having a plurality of program instructions for execution by the one or more processors. The program instructions implement a method. The method receives one or more notifications, or calls, on the smartphone and determines whether the one or more notifications, or calls, are during work hours and if so, automatically selecting the work VM as default. If the one or more notifications, or calls, are not during work hours, the method automatically selects the personal VM as default. The method further prompts a user to switch VMs if the one or more notifications, or calls, come in during a time that is a non-default VM.

DETAILED DESCRIPTION

Figure 1:
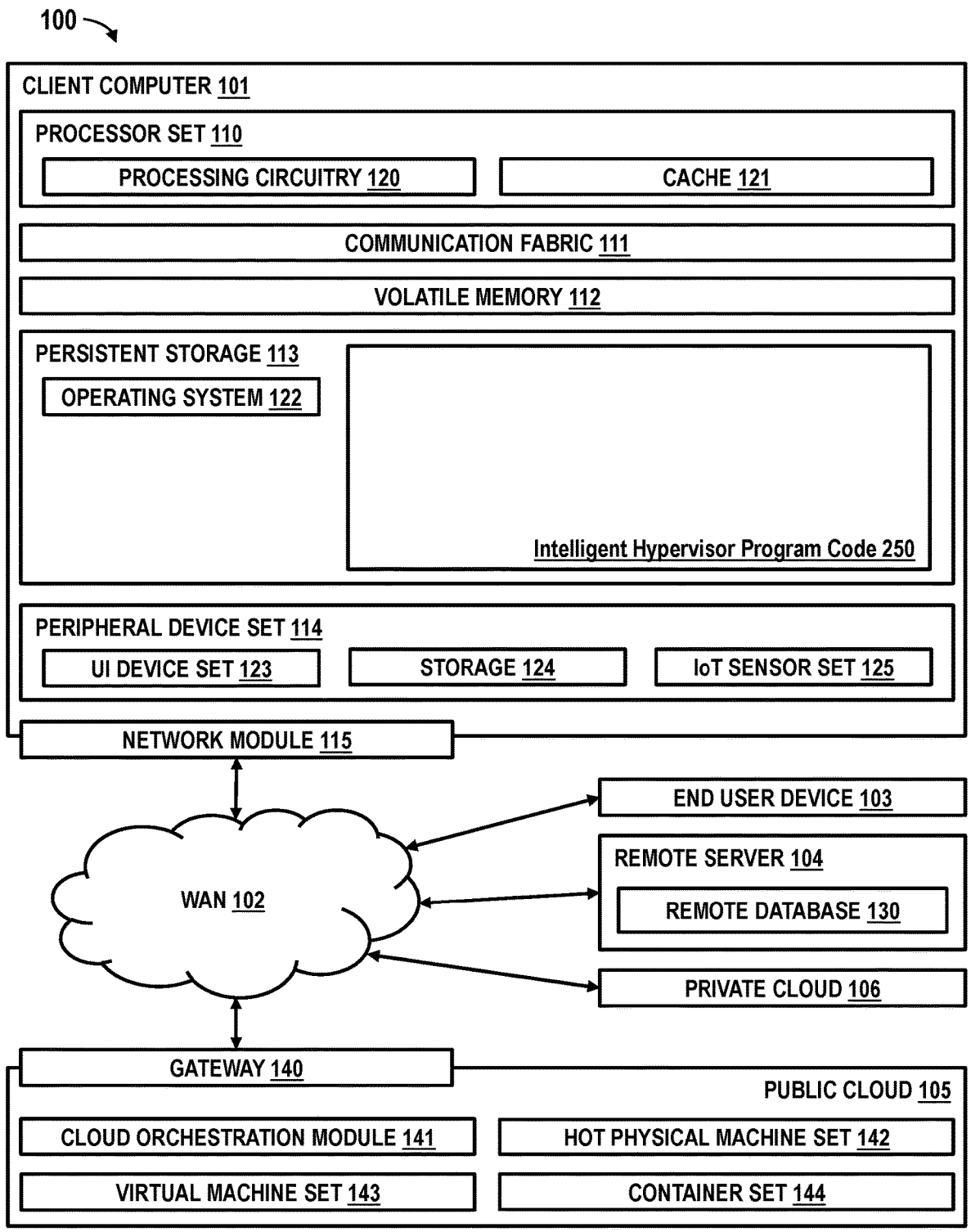
FIG. 1 depicts a diagram graphically illustrating the hardware components of intelligent hypervisor computing environment 100 and a cloud computing environment, in accordance with an embodiment of the present invention.

The present invention discloses a method for leveraging a hypervisor installed on a smartphone, or any other electronic device, that is running separate VMs. The separate VMs may be for personal use and work use, thereby distinguishing the operating environments on the same piece of hardware.

Nowadays, many people perform work outside of a traditional office space, and often, while on-the-go. For example, people may respond to their work text messages and e-mails from their car or the supermarket, just to give a few examples. By keeping each VM (personal use and work use) on separate storage devices, a greater separation of confidential and work-related data, can be achieved.

In this separation environment, the hypervisor can enforce various settings such that the VMs are distinguishable. Additionally, the hypervisor can provide smart options to a user such that notifications and calls ring, vibrate, and appear differently when they occur for each VM.

The present invention dynamically handles different mobile virtual environments, plurality of services, and actions to smoothly compute the transition from one VM environment to another on the same device.

The plurality of environments on a user's device (e.g., smartphone, tablet, etc.) may be automatically determined based on various contextual factors such as a user's contacts, geofence, application notifications, home screen setup, background, and so forth.

Hereinafter, exemplary embodiments of the present invention will be described in detail with reference to the attached drawings.

The present invention is not limited to the exemplary embodiments below but may be implemented with various modifications within the scope of the present invention. In addition, the drawings used herein are for purposes of illustration, and may not show actual dimensions.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 depicts a diagram graphically illustrating the hardware components of intelligent hypervisor computing environment 100 and a cloud computing environment in accordance with an embodiment of the present invention.

Augmented virtual office layout computing environment 100 contains an example of an environment for the execution of at least some of the computer code involved in performing the inventive methods, such as intelligent hypervisor program code 250. In addition to intelligent hypervisor program code 250, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 250, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 250 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open source Portable Operating System Interface type operating systems that employ a kernel. The code included in block 250 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
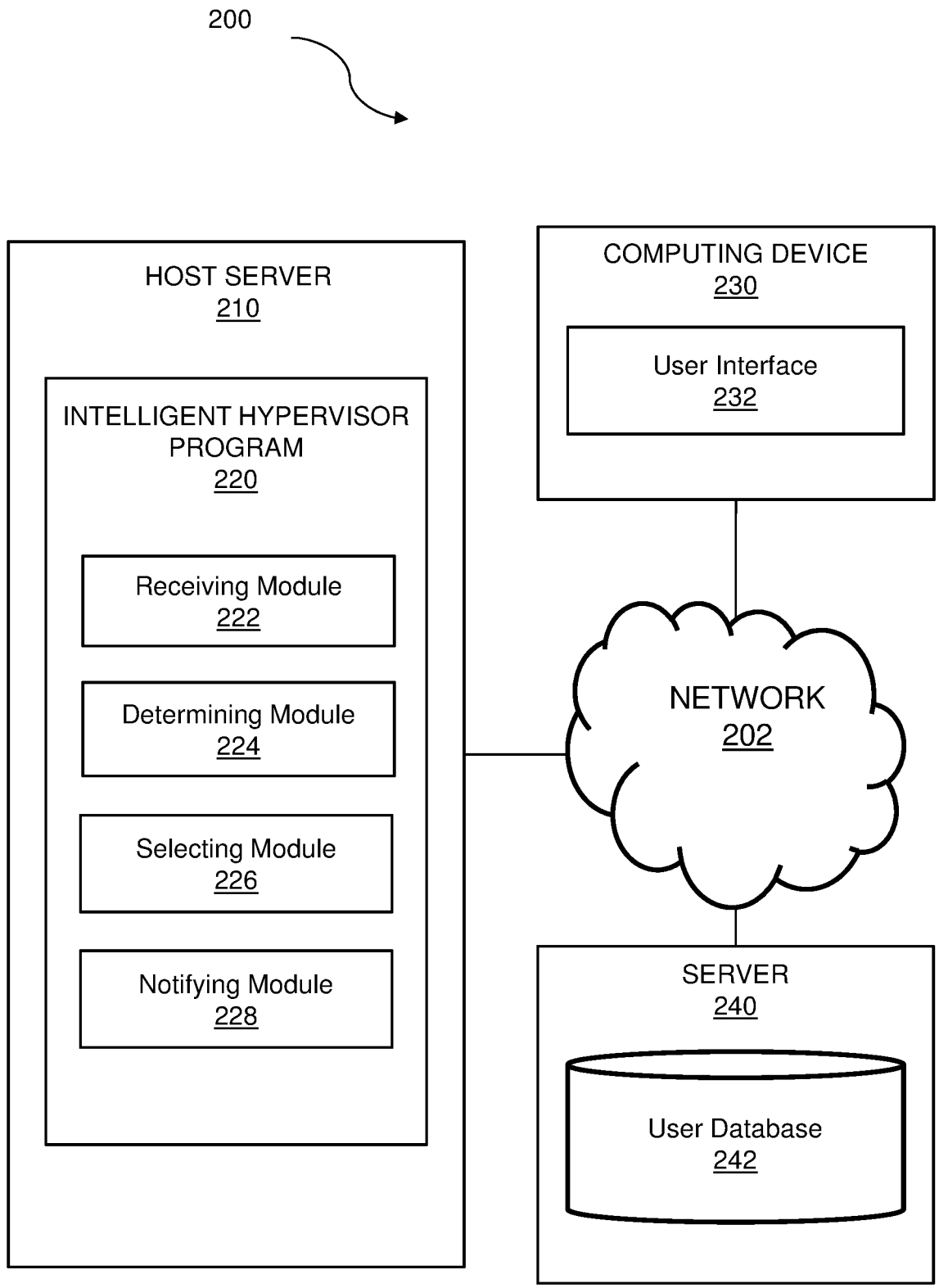
FIG. 2 illustrates intelligent hypervisor computing environment 200, in accordance with an embodiment of the present invention.

FIG. 2 illustrates intelligent hypervisor computing environment 200, in accordance with an embodiment of the present invention. Intelligent hypervisor computing environment 200 includes host server 210, and computing device 230, and server 240 all connected via network 202. The setup in FIG. 2 represents an example embodiment configuration for the present invention and is not limited to the depicted setup to derive benefit from the present invention.

In an exemplary embodiment, host server 210 includes intelligent hypervisor program 220. In various embodiments, host server 210 may be a laptop computer, tablet computer, netbook computer, personal computer (PC), a desktop computer, a personal digital assistant (PDA), a smart phone, or any programmable electronic device capable of communicating with computing device 230 and server 240 via network 202. Host server 210 may include internal and external hardware components, as depicted, and described in further detail with reference to FIG. 1. In other embodiments, host server 210 may be implemented in a cloud computing environment, as further described in relation to FIG. 1 herein. Host server 210 may also have wireless connectivity capabilities allowing it to communicate with computing device 230, server 240, and other computers or servers over network 202.

With continued reference to FIG. 2, computing device 230 includes user interface 232 and may be a laptop computer, tablet computer, netbook computer, personal computer (PC), a desktop computer, a personal digital assistant (PDA), a smart phone, or any programmable electronic device capable of communicating with host server 210 and server 240 via network 202. Computing device 230 may include internal and external hardware components, as depicted, and described in further detail below with reference to FIG. 1. In other embodiments, computing device 230 may be implemented in a cloud computing environment, as described in relation to FIG. 1, herein.

In exemplary embodiments, user interface 232 is a computer program which allows a user to interact with computing device 230 and other connected devices via network 202. For example, user interface 232 may be a graphical user interface (GUI). In addition to comprising a computer program, user interface 232 may be connectively coupled to hardware components, such as those depicted in FIG. 1, for receiving user input. In an exemplary embodiment, user interface 232 may be a web browser, however in other embodiments user interface 232 may be a different program capable of receiving user interaction and communicating with other devices.

With continued reference to FIG. 2, server 240 comprises user database 242 and may be a laptop computer, tablet computer, netbook computer, personal computer (PC), a desktop computer, a personal digital assistant (PDA), a smart phone, or any programmable electronic device capable of communicating with host server 210 and computing device 230 via network 202.

In exemplary embodiments user database 242 comprises various sets of user information related to separate VMs on computing device 230. For example, one set of user data may include the user's personal data such as family and friends' contact information, personal notes, lists, text messages, home screen set up with personalized applications (e.g., personal banking information, social media and e-mail logins, and so forth). Another set of user data may include the user's work-related data such as colleagues and clients' contact information, work-related documents and text messages, home screen set up with work-related applications (e.g., company portal log in, etc.).

In exemplary embodiments, user database 242 may also keep track of a user's daily routine and schedule to determine working hours versus personal hours during a twenty-four-hour period. Users have the option to opt-in, and out, of any service that tracks daily activities and routines.

With continued reference to FIG. 2, host server 210 includes intelligent hypervisor program 220. Host server 210 may be a laptop computer, tablet computer, netbook computer, personal computer (PC), a desktop computer, a personal digital assistant (PDA), a smart phone, or any programmable electronic device capable of communicating with computing device 230 and server 240 via network 202.

Intelligent hypervisor program 220 provides the ability to generate custom virtualized management to enable different mobile environments in a single mobile device (e.g., a phone, a tablet, etc.). In alternative embodiments, intelligent hypervisor program 220 may be utilized as a service in a cloud environment.

With continued reference to FIG. 2, intelligent hypervisor program 220, in an exemplary embodiment, may be a computer application on host server 210 that contains instruction sets, executable by a processor. The instruction sets may be described using a set of functional modules. In exemplary embodiments, intelligent hypervisor program 220 may receive input from computing device 230 and server 240 over network 202. In alternative embodiments, intelligent hypervisor program 220 may be a computer application on computing device 230, or a standalone program on a separate electronic device.

With continued reference to FIG. 2, the functional modules of intelligent hypervisor program 220 include receiving module 222, determining module 224, selecting module 226, and notifying module 228.

Figure 3:
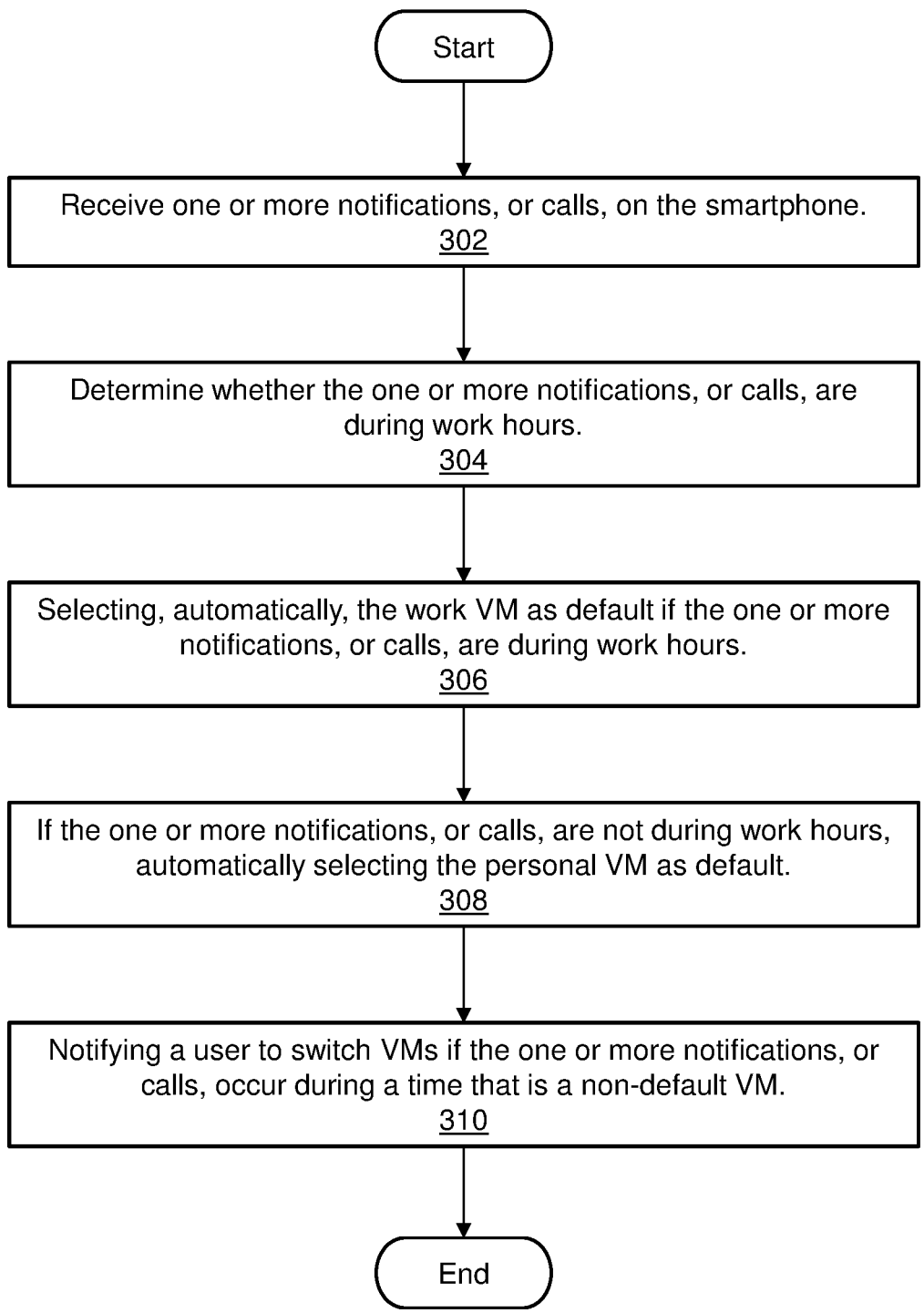
FIG. 3 is a flowchart illustrating the operation of intelligent hypervisor program 220 of FIG. 2, in accordance with an embodiment of the present invention.

FIG. 3 is a flowchart illustrating the operation of intelligent hypervisor program 220 of FIG. 2, in accordance with embodiments of the present disclosure.

With reference to FIGS. 2 and 3, receiving module 222 includes a set of programming instructions, in intelligent hypervisor program 220, to receive one or more notifications, or calls, on a smartphone (step 302). The set of programming instructions is executable by a processor.

In exemplary embodiments, a smartphone receives the incoming notifications and/or calls. In alternative embodiments, any electronic device, known to one of ordinary skill in the art, that can receive incoming notifications (i.e., text messages, pop-ups, banner notifications, badges, and so forth) and calls can be used.

In exemplary embodiments, the hypervisor installed on the electronic device (i.e., smartphone) separates personal and work-related operating environments. A VM on the electronic device is configured for personal use and a separate VM is for work-related use.

Intelligent hypervisor program 220 may keep data physically separate on the smartphone by using internal storage of the smartphone for one VM and using a Secure Digital (SD) card in the smartphone for the other VM.

In alternative embodiments, depending on the hardware more than two VMs could possibly be utilized. Leveraging a third VM, or more, for a second job or potentially a dedicated environment for a specific client may be utilized on the smartphone.

In exemplary embodiments, each VM may contain its own data storage solution as depicted in FIG. 1.

In exemplary embodiments, intelligent hypervisor program 220 has rules in place that enforce different background images, notification sounds, haptic feedback patterns, vibration patterns, and ringtones for each VM on the smartphone.

With reference to an illustrative example, Joe works at a corporate law office where he needs to have a smartphone just for work, since he needs to respond to text messages, notifications, and phone calls. He also has a personal smartphone. Joe needs to carry these two smartphones whenever he leaves the house, and he finds it burdensome. Joe wishes he could combine his work phone and his personal phone into one device. Intelligent hypervisor program 220 is just what Joe needs to receive separate phone calls and messages for both personal and work, all the while only using one smartphone device.

With continued reference to FIGS. 2 and 3, determining module 234 includes a set of programming instructions in intelligent hypervisor program 220, to determine whether the one or more notifications, or calls, are during work hours (step 304). The set of programming instructions is executable by a processor.

In exemplary embodiments, work hours may be designated by the user or set to a default 9 am-5 pm setup. Determining module 234 accesses computing device 230 to automatically obtain a geographic location via global positioning system (GPS), time zone, current time, and user identification.

With continued reference to FIGS. 2 and 3, selecting module 236 includes a set of programming instructions in intelligent hypervisor program 220, to automatically select the work VM as default if the one or more notifications, or calls, are during work hours (step 306). The set of programming instructions is executable by a processor.

Selecting module 236 further includes a set of programming instructions in intelligent hypervisor program 220, to automatically select the personal VM as default if the one or more notifications, or calls, are not during work hours (step 308). The set of programming instructions is executable by a processor.

In exemplary embodiments, determining module 234 determines whether the user is physically at a work location, if a current time is not during work hours and if so, automatically selecting, via selecting module 236, the work VM as default.

In alternative embodiments, determining module 234 determines whether the user is physically at home, if a current time is during work hours and if so, automatically selecting, via selecting module 236, the personal VM as default.

In further exemplary embodiments, determining module 234 determines a default VM based upon known contact information for one or more incoming notifications, text messages, or calls and automatically selects, via selecting module 236, a default VM for one or more outbound notifications, text messages, or calls based upon associated criteria such as time, location, and user contact information.

With reference to the illustrative example above, Joe is at home for his lunch break on a workday and receives an incoming phone call. Determining module 234 determines that Joe is in his house based on GPS information of his smartphone. Additionally, the incoming phone call is from one of Joe's personal contacts. Based on this information, selecting module 236 selects Joe's personal VM on his smartphone to answer the incoming phone call. Since Joe was occupied making himself a sandwich, his personal voicemail message answered the incoming phone call and Joe's friend was able to leave a message.

With continued reference to FIGS. 2 and 3, notifying module 238 includes a set of programming instructions in intelligent hypervisor program 220, to notify a user to switch VMs if the one or more notifications, or calls, occur during a time that is a non-default VM (step 310). The set of programming instructions is executable by a processor.

In exemplary embodiments, a lock screen on the smartphone device can be a primary interface allowing the user to toggle between, and see, the one or more received notifications, or calls, for both VMs on a home screen of the smartphone.

Furthermore, notifying module 238 alerts the user when the one or more notifications, or calls, occur during a time that is the non-default VM (e.g., when a work call is received after working hours or a personal call is received during working hours, and so forth), and switching over to the non-default VM to take additional action. The additional action may be sending the phone call directly to the appropriate VM voice mailbox, automatically responding with a personalized message, or answering the phone call with the appropriate greeting.

In exemplary embodiments, the alert may be a separate sound or vibration pattern, or a visual cue that appears on the home screen of the user's smartphone.

With continued reference to the illustrative example above, notifying module 238 sends a ringtone to Joe's smartphone alerting him to a work call while he is at home for his lunch break. Since Joe's phone has identified Joe as being at his home and away from his office, Joe can switch from the smartphone's personal default VM mode to work VM mode. Joe switches the phone to work VM mode to answer the incoming call. Since Joe is still busy making his sandwich and does not answer his phone, his voice mail answers with his work voicemail message, rather than his personal voicemail greeting. Joe's co-worker is thus able to leave a message.

In alternative embodiments, intelligent hypervisor program 220 can dynamically deploy an encapsulated user environment on the user's smartphone based on the user's daily routine.

For example, if the user took a vacation day from work then intelligent hypervisor program 220 can switch the smartphone to the user's personal VM for the entire day.

In exemplary embodiments, network 202 is a communication channel capable of transferring data between connected devices and may be a telecommunications network used to facilitate telephone calls between two or more parties comprising a landline network, a wireless network, a closed network, a satellite network, or any combination thereof. In another embodiment, network 202 may be the Internet, representing a worldwide collection of networks and gateways to support communications between devices connected to the Internet. In this other embodiment, network 202 may include, for example, wired, wireless, or fiber optic connections which may be implemented as an intranet network, a local area network (LAN), a wide area network (WAN), or any combination thereof. In further embodiments, network 202 may be a Bluetooth network, a WiFi network, or a combination thereof. In general, network 202 can be any combination of connections and protocols that will support communications between host server 210, computing device 230, and server 240.

The invention claimed is:

1. A computer-implemented method for utilizing a hypervisor installed on a smartphone running separate virtual machines (VMs), thereby allowing for separate operating environments on one piece of hardware, the method comprising:
    receiving one or more notifications, or calls, on the smartphone;
    determining whether the one or more notifications, or calls, are during work hours;
    selecting, automatically, a work VM as default if the one or more notifications, or calls, are during work hours;
    if the one or more notifications, or calls, are not during work hours, automatically selecting a personal VM as default; and
    notifying a user to switch VMs if the one or more notifications, or calls, occur during a time that is a non-default VM.

2. The computer-implemented method of claim 1, further comprising:
    if a current time is not during work hours, determining whether the user is physically at a work location, and if so, automatically selecting the work VM as default; and
    if the current time is during work hours, determining whether the user is physically at home, and if so, automatically selecting the personal VM as default.

3. The computer-implemented method of claim 1, further comprising:
    keeping data physically separate on the smartphone by using internal storage of the smartphone for one VM and using an SD card in the smartphone for the other VM.

4. The computer-implemented method of claim 1, wherein the hypervisor has rules in place that enforce different background images, notification sounds, haptic feedback patterns, vibration patterns, and ringtones for each VM on the smartphone.

5. The computer-implemented method of claim 1, further comprising:
    determining a default VM based upon known contact information for one or more incoming notifications, or calls; and
    automatically selecting a default VM for one or more outbound notifications, or calls, based upon associated criteria such as time, location, and user contact information.

6. The computer-implemented method of claim 1, wherein a lock screen on the smartphone would be a primary interface, comprising:
    allowing the user to toggle between, and see, the one or more notifications, or calls, for both VMs on a home screen of the smartphone;
    alerting the user when the one or more notifications, or calls, occur during a time that is the non-default VM, wherein the alert is a separate sound, a vibration pattern, or a visual cue that appears on the home screen of the smartphone; and
    switching over to the non-default VM to take additional action.

7. The computer-implemented method of claim 1, further comprising:
    dynamically deploying an encapsulated user environment on the smartphone based on the user's daily routine.

8. A computer program product for utilizing a hypervisor installed on a smartphone running separate virtual machines (VMs), thereby allowing for separate operating environments on one piece of hardware, comprising a non-transitory tangible storage device having program code embodied therewith, the program code executable by a processor of a computer to perform a method, the method comprising:
    receiving one or more notifications, or calls, on the smartphone;
    determining whether the one or more notifications, or calls, are during work hours;
    selecting, automatically, a work VM as default if the one or more notifications, or calls, are during work hours;
    if the one or more notifications, or calls, are not during work hours, automatically selecting a personal VM as default; and
    notifying a user to switch VMs if the one or more notifications, or calls, occur during a time that is a non-default VM.

9. The computer program product of claim 8, further comprising:
    if a current time is not during work hours, determining whether the user is physically at a work location, and if so, automatically selecting the work VM as default; and
    if the current time is during work hours, determining whether the user is physically at home, and if so, automatically selecting the personal VM as default.

10. The computer program product of claim 8, further comprising:
    keeping data physically separate on the smartphone by using internal storage of the smartphone for one VM and using an SD card in the smartphone for the other VM.

11. The computer program product of claim 8, wherein the hypervisor has rules in place that enforce different background images, notification sounds, haptic feedback patterns, vibration patterns, and ringtones for each VM on the smartphone.

12. The computer program product of claim 8, further comprising:
    determining a default VM based upon known contact information for one or more incoming notifications, or calls; and
    automatically selecting a default VM for one or more outbound notifications, or calls, based upon associated criteria such as time, location, and user contact information.

13. The computer program product of claim 8, wherein a lock screen on the smartphone would be a primary interface, comprising:
    allowing the user to toggle between, and see, the one or more notifications, or calls, for both VMs on a home screen of the smartphone;
    alerting the user when the one or more notifications, or calls, occur during a time that is the non-default VM, wherein the alert is a separate sound, a vibration pattern, or a visual cue that appears on the home screen of the smartphone; and
    switching over to the non-default VM to take additional action.

14. The computer program product of claim 8, further comprising:
   dynamically deploying an encapsulated user environment on the smartphone based on the user's daily routine.

15. A computer system for utilizing a hypervisor installed on a smartphone running separate virtual machines (VMs), comprising:
   one or more computer devices each having one or more processors and one or more tangible storage devices; and a program embodied on at least one of the one or more storage devices, the program having a plurality of program instructions for execution by the one or more processors, the program instructions comprising instructions for:
   receiving one or more notifications, or calls, on the smartphone;
   determining whether the one or more notifications, or calls, are during work hours;
   selecting, automatically, a work VM as default if the one or more notifications, or calls, are during work hours;
   if the one or more notifications, or calls, are not during work hours, automatically selecting a personal VM as default; and
   notifying a user to switch VMs if the one or more notifications, or calls, occur during a time that is a non-default VM.

16. The computer system of claim 15, further comprising:
   if a current time is not during work hours, determining whether the user is physically at a work location, and if so, automatically selecting the work VM as default; and
   if the current time is during work hours, determining whether the user is physically at home, and if so, automatically selecting the personal VM as default.

17. The computer system of claim 15, further comprising:
   keeping data physically separate on the smartphone by using internal storage of the smartphone for one VM and using an SD card in the smartphone for the other VM.

18. The computer system of claim 15, wherein the hypervisor has rules in place that enforce different background images, notification sounds, haptic feedback patterns, vibration patterns, and ringtones for each VM on the smartphone.

19. The computer system of claim 15, further comprising:
   determining a default VM based upon known contact information for one or more incoming notifications, or calls; and
   automatically selecting a default VM for one or more outbound notifications, or calls, based upon associated criteria such as time, location, and user contact information.

20. The computer system of claim 15, wherein a lock screen on the smartphone would be a primary interface, comprising:
   allowing the user to toggle between, and see, the one or more notifications, or calls, for both VMs on a home screen of the smartphone;
   alerting the user when the one or more notifications, or calls, occur during a time that is the non-default VM, wherein the alert is a separate sound, a vibration pattern, or a visual cue that appears on the home screen of the smartphone; and
   switching over to the non-default VM to take additional action.

* * * * *